United States Patent [19]

Peterson et al.

[11] 3,806,889

[45] Apr. 23, 1974

[54] ASSOCIATIVE MEMORY INCLUDING A RESOLVER

[75] Inventors: Ralph Warren Peterson; Nicholas Kimbrough Smith, both of Naperville; David Vlack, St. Charles, all of Ill.

[73] Assignee: Bell Telephone Laboratories, Incorporated, Murray Hill, Berkeley Heights, N.J.

[22] Filed: Dec. 19, 1972

[21] Appl. No.: 316,430

[52] U.S. Cl. .......... 340/172.5
[51] Int. Cl. .......... G11c 15/00
[58] Field of Search .......... 340/172.5

[56] References Cited

UNITED STATES PATENTS

| | | | |
|---|---|---|---|
| 3,406,380 | 10/1968 | Bradley et al. | 340/172.5 |
| 3,456,243 | 7/1969 | Cass | 340/172.5 |
| 3,602,899 | 8/1971 | Lindquist et al. | 340/172.5 |
| 3,634,829 | 1/1972 | Campi et al. | 340/172.5 |

*Primary Examiner*—Paul J. Henon
*Assistant Examiner*—Paul R. Woods
*Attorney, Agent, or Firm*—John C. Albrecht

[57] ABSTRACT

An access resolver is disclosed for use in an associative memory containing a plurality of storage locations in an ordered arrangement. In response to an associative search operation all storage locations containing data matching an associative search criterion are identified as candidates for accessing. The resolver selects for accessing the candidate location which, according to a predetermined criterion for the ordered arrangement, is nearest to the location last selected for accessing.

16 Claims, 5 Drawing Figures

ACCESS CONTROL CCT TRUTH TABLE

| SIGNALS AT | | | | |
|---|---|---|---|---|
| Q | M | $P_I$ | D | $P_O$ |
| 0 | 0 | 0 | 0 | 0 |
| 0 | 0 | 1 | 0 | 1 |
| 0 | 1 | 0 | 0 | 0 |
| 0 | 1 | 1 | 1 | 0 |
| 1 | 0 | 0 | 0 | 1 |
| 1 | 0 | 1 | 0 | 1 |
| 1 | 1 | 0 | 0 | 1 |
| 1 | 1 | 1 | 1 | 1 |

ASSOCIATIVE MEMORY INCLUDING A RESOLVER

BACKGROUND OF THE INVENTION

1. Field of the Invention

This invention relates to the field of associative memories and, more particularly, to associative memories including access resolving apparatus.

2. Description of the Prior Art

In an associative memory a storage location is identified by the data stored in it. More specifically, to identify a storage location, a search is conducted for a location in which data having a specified characteristic are stored. The desired characteristic is referred to as the search criterion. After a location containing data matching the search criterion is identified, it can be accessed for purposes of reading the contents of the entire location or for writing new data into the location. It is often the case, however, that more than one location may contain data matching the search criterion. In such a situation a plurality of locations are candidate locations for accessing purposes. Apparatus is, therefore, required to select one location for accessing from the plurality of candidate locations. The apparatus used for this purpose is referred to as an access resolver.

The particular storage location selected by an access resolver from the plurality of storage locations containing data matching the search criterion is determined in the prior art by the relative resolving priorities of the candidate storage locations. Specifically, the candidate storage location with the highest priority is selected. Moreover, in prior art resolvers the resolving priority of each storage location is fixed and is not varied as a function of the storage locations which have been identified and accessed previously. Thus, using a prior art resolver, if there is no intervention under program control, an associative search conducted a plurality of times using the same search criterion results in the selection of the same highest priority storage location each time even though there may be a plurality of candidates. As a result, if it is desired that each of the plurality of candidate locations be identified, program controlled intervention in the search process is required. In one method of program controlled intervention, the data stored in the selected highest priority location are modified to prevent the data from matching the search criterion on a subsequent associative search. As a result, in the succeeding associative search operations the previously selected locations are no longer candidate locations. In other methods, certain flip-flops associated with the storage locations are set under program control to redirect the next associative search to other memory areas. While such methods are effective, they require time and the execution of specific program instructions. Greater efficiency in searching for each of a plurality of locations containing data matching a search criterion would be achieved if nonproductive program steps were eliminated. More specifically, greater efficiency would result if a sequence of associative searches using the same search criterion would result in the selection for accessing of each of the appropriate storage locations without requiring program controlled intervention.

SUMMARY OF THE INVENTION

In a memory according to applicants' invention, the selection of a storage location for accessing is controlled by the relative positions of the candidate locations in an ordered arrangement of the storage locations in the memory with respect to the last location selected for accessing. In a specific embodiment of applicants' invention, an access resolver is provided which includes a plurality of access control circuits, each containing a resolver flip-flop and each individually associated with a storage location. While there are as many resolver flip-flops as storage locations, only one resolver flip-flop is set at any time. The flip-flop which is set establishes the associated storage location as the location for accessing. An output signal from the access control circuit containing the set resolver flip-flop is propagated in a particular direction on a reentrant propagation bus to the access control circuits associated with the other locations in the memory. The propagated signal is used in a subsequent associative search operation to enable the setting of the resolver flip-flop in the first succeeding access control circuit on the propagation bus, which is associated with a location containing data matching the associative search criterion.

DESCRIPTION OF THE ILLUSTRATIVE EMBODIMENT

Figure 1:
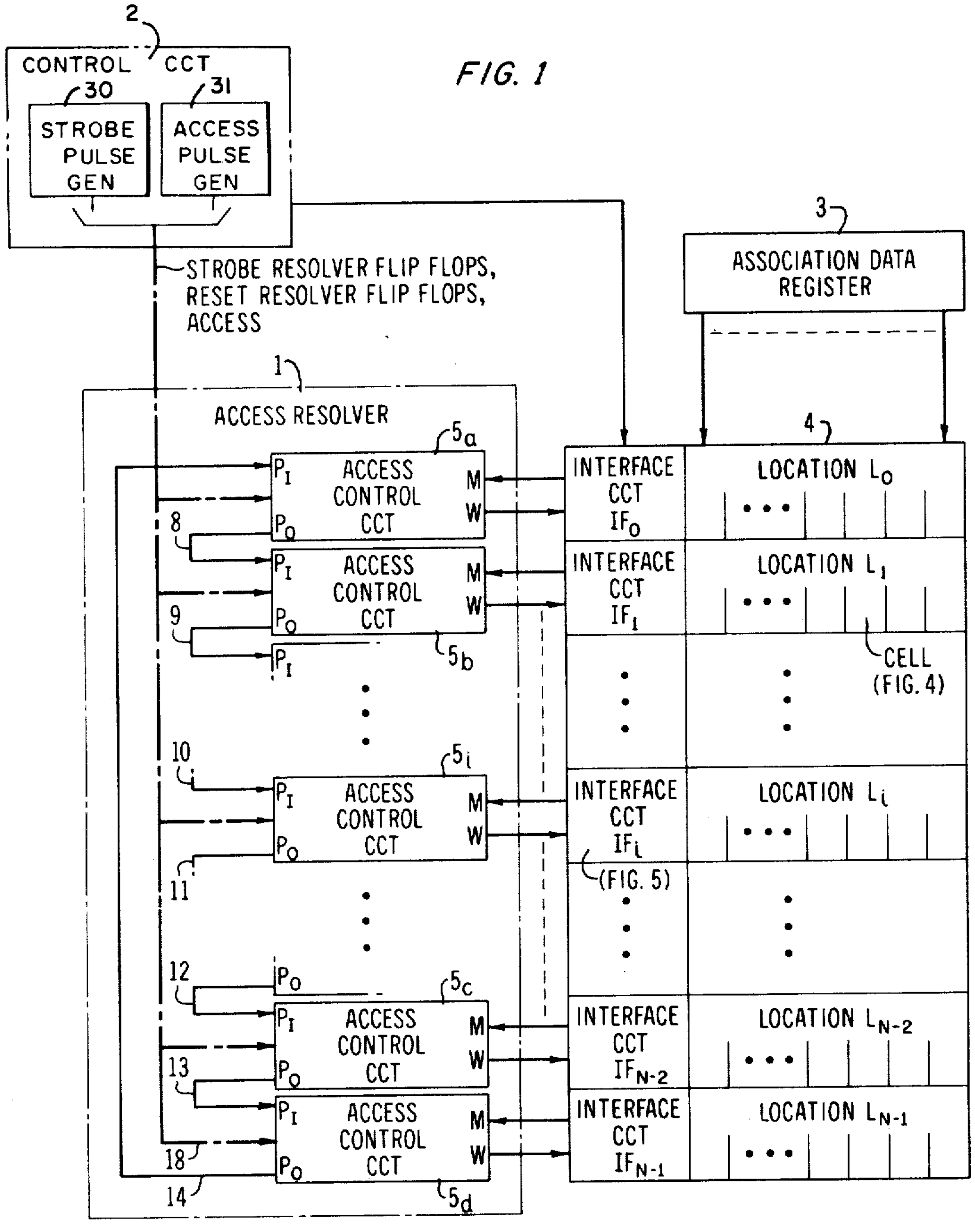
FIG. 1 shows a block diagram representation of an associative memory system embodying applicants' invention.

A block diagram representation of an associative memory system embodying applicants' invention is shown in FIG. 1. The resolver 1 contains a plurality of interconnected access control circuits, typically represented by the access control circuit $5_i$. Each access control circuit is associated with a storage location $L_i$ in the memory 4. The control circuit $5_i$ is interconnected with its associated storage location $L_i$ in the memory 4 by two lines. The signal on the line from the storage location $L_i$ to the M input of the control circuit $5_i$ is equal to logical "1" when the data contained in the association data register 3, comprising the search criterion, matches the data stored in the storage location $L_i$. The signal on the line from the W output of the access control circuit $5_i$ to the location $L_i$ is equal to logical "1" when the storage location $L_i$ is accessed for reading or writing purposes.

Figure 4:
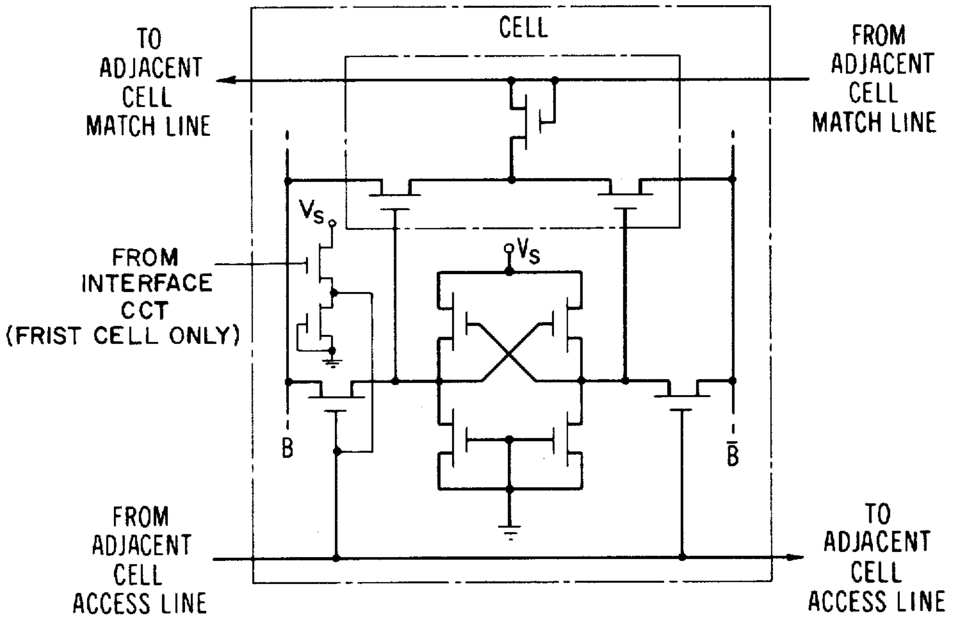
FIG. 4 shows a schematic diagram of a cell suitable for use in the memory shown in FIG. 1.
Figure 5:
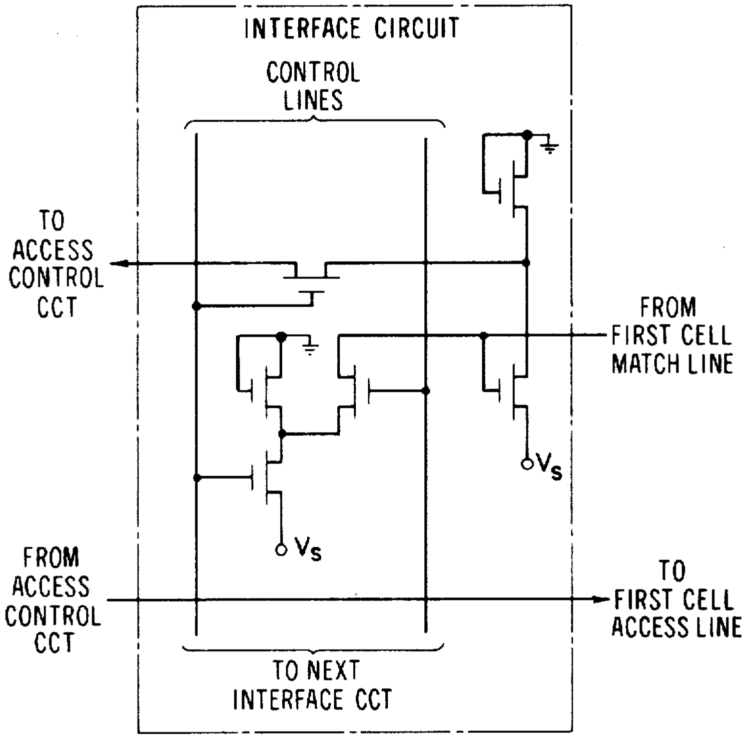
FIG. 5 shows a schematic diagram of an interface circuit suitable for use in the memory shown in FIG. 1.

The memory 4 does not form a part of this invention and the specific structure thereof is important only in that there must be consistency of signals as described above. A plurality of memory structures and designs are known in the prior art, any of which could be used as the memory 4 (FIG. 1). For example, the following patents show memories, together with the appropriate control circuitry, which could serve as the memory 4: R. J. Koerner et al. U.S. Pat. No. 3,284,775, issued Nov. 8, 1966; R. J. Koerner et al. U.S. Pat. No. 3,402,398, issued Sept. 17, 1968; A. B. Lindquist et al. U.S. Pat. No. 3,602,899, issued Aug. 31, 1971. For convenience a circuit suitable for use as a cell in the memory 4 is shown in FIG. 4. One such cell is required for each storage bit. The B and $\overline{B}$ lines carry signals representing a bit and its complement, respectively, from the association data register 3. One such set of B and $\overline{B}$ lines is required for each bit in the register 3 (FIG. 1). The typical interface circuit IFhd i operates upon signals appearing on the cell match lines (FIG. 4) for the location $L_i$ (FIG. 1) to produce the aforementioned "1" signal when the stored data matches the search criterion. A typical interface circuit is shown for convenience in FIG. 5.

It should be noted in FIG. 1 that the access control circuits are interconnected. The typical access control circuit $5_i$ receives signals at its $P_i$ input from the preceding access control circuit and generates signals at its $P_o$ output for propagation to the succeeding access control circuit. The lines interconnecting the access control circuits, specifically, the lines 8, 9, 10, 11, 12, 13, and 14, are all part of what will be referred to as a propagation bus. It should be noted that the bus is reentrant or closed on itself since the line 14 connects the $P_o$ output of the access control circuit $5_d$ to the $P_i$ input of the access control circuit $5_a$. The use of this propagation bus will become clear in the subsequent discussion.

The access control circuits shown in FIG. 1 operate together in the resolver 1 to determine which one of the storage locations in the memory 4 is to be accessed in response to an associative search operation. The determination is based on the relative positions on the propagation bus of the access control circuits for storage locations containing data matching the associative search criterion. More specifically, of the storage locations containing data matching the search criterion, the selected location is the one whose associated access control circuit is the nearest succeeding access control circuit on the propagation bus with respect to the access control circuit for the storage location last selected for accessing.

Figures 2, 3:
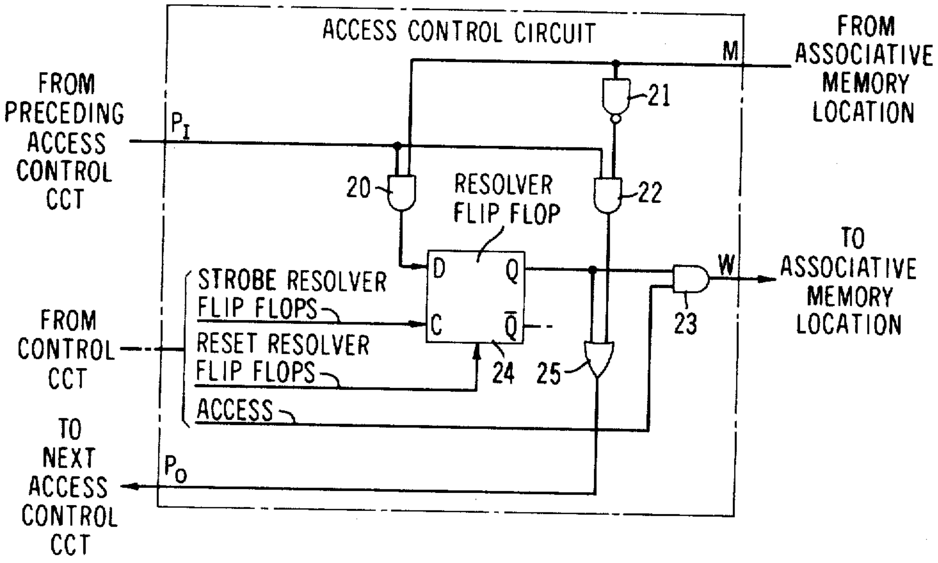
FIG. 2 shows a schematic diagram of an access control circuit.
FIG. 3 shows a truth table for an access control circuit.

Having described generally the operation of the resolver 1 (FIG. 1), attention is turned to a more detailed discussion of its operation including the operation of circuitry suitable to perform the functions of the access control circuits. One embodiment of an access control circuit is shown in detail in FIG. 2. As can be seen therein, the circuit contains a resolver flip-flop 24, which in this illustrative embodiment of applicants' invention is a D flip-flop. As is well known, a D flip-flop assumes the logical state of the signal present at its D input when a strobe signal is applied to its C input. It should be noted that while each of the interconnected access control circuits, typically represented by circuit $5_i$ in FIG. 1, contains a resolver flip-flop 24 (FIG. 2), only the resolver flip-flop for one of the access control circuits (FIG. 1) is set at any one time. In addition, it should be noted that a truth table representing the logical functions performed by an access control circuit (FIG. 2) is shown in FIG. 3. The significance of the requirement that only one resolver flip-flop be set at a time and operation of the access control circuits will be illustrated by the discussion which follows.

To illustrate the operation of the resolver 1, it is first assumed that the flip-flop 24 (FIG. 2) in the access control circuit $5_a$ (FIG. 1) is set. It will be recalled that only one resolver flip-flop can be set at one time. Referring to the truth table shown in FIG. 3, when the resolver flip-flop 24 (FIG. 2) in an access control circuit is set, indicated by the signal at the Q output of the flip-flop being equal to "1," the signal at $P_o$ is equal to "1." Therefore, a signal equal to logical "1" appears on line 8 (FIG. 1) and is applied to the $P_i$ input of access control circuit $5_b$. It is assumed that, at this point, an associative search operation is initiated in which association data placed in the association data register 3 (FIG. 1) is compared in parallel with the data stored in each of the N storage locations in memory 4. It is further assumed, for purposes of illustration, that the signals applied to the M inputs of all of the access control circuits except circuits $5_c$ and $5_d$ are equal to "O," indicating that the data stored in the storage locations corresponding to the respective access control circuits do not match the search criterion. The signals on the M inputs of the access control circuits $5_c$ and $5_d$ are assumed to be equal to "1," indicating an associative match for the data stored in locations $L_{N-2}$ and $L_{N-1}$, respectively.

Under the above assumed conditions it should be observed that the signal applied to the $P_i$ input of the access control circuit $5_b$ is equal to "1" while the signal applied to the M input of that circuit is equal to "O." In addition, since the resolver flip-flop 24 (FIG. 2) in the access control circuit $5_a$ (FIG. 1) is set, the resolver flip-flop 24 (FIG. 2) in each of the other access control circuits, including the circuit $5_b$, (FIG. 1) is reset. In view of these assumed conditions for the access control circuit $5_b$, it can be seen from the truth table shown in FIG. 3 that the signal generated by the access control circuit $5_b$ (FIG. 1) at its $P_o$ output is equal to "1." Thus, the "1" applied to the $P_i$input of the access control circuit $5_b$ is propagated to the $P_o$ output of that circuit. Moreover, since all of the access control circuits intervening on the propagation bus between the circuit $5_b$ and the circuit $5_c$ are subjected to the same conditions as is the circuit $5_b$, the "1" signal appearing at the $P_o$ output of the access control circuit $5_b$ continues to propagate until it appears on line 12 at the $P_i$ input of the access control circuit $5_c$.

It will be recalled that the signal on the M input of the access control circuit $5_c$ is equal to "1," indicating that the data stored in location $L_{N-2}$ associatively matches the current contents of the association data register 3. It is important to note in the truth table shown in FIG. 3 that the signal on the $P_o$ output of an access control circuit (FIG. 2) is equal to "O" when the Q output of the resolver flip-flop 24 equals "O" and signals equal to "1" are applied to both the $P_i$ and the M inputs of the access control circuit. As a result, under the assumed conditions, the signal generated at the $P_o$ output of the access control circuit $5_c$ (FIG. 1) and applied to the $P_i$ input of the access control circuit $5_d$ by means of line 13 is equal to "O." Thus, it should be observed that, as a result of the signal applied to the M input of the access control circuit $5_c$ being equal to "1," the "1" signal applied to the $P_i$ input of the circuit $5_c$ does not propagate through the circuit $5_c$ to the $P_o$ output of that circuit. In addition, it should be observed that under these conditions the truth table (FIG. 3) indicates that the signal at the D input of the resolver flip-flop 24 (FIG. 2) for the circuit $5_c$ (FIG. 1) is equal to "1." Since this resolver flip-flop 24 (FIG. 2) is of the D type and is currently reset, a strobe pulse applied to the C input of the flip-flop will cause it to change state. The occurrence of strobe pulses is controlled by the control circuit 2 (FIG. 1) and will be discussed subsequently.

It will be recalled that a signal equal to "O" is applied to the $P_i$ input of the access control circuit $5_d$ and that the signal applied to the M input of that circuit equals "1." With the Q output of the resolver flip-flop 24 (FIG. 2) in the access control circuit $5_d$ (FIG. 1) equal to "O," it can be seen in the truth table (FIG. 3) that the signal appearing at the $P_o$ output of the circuit $5_d$ (FIG. 1) and on the line 14 is equal to "O." This "O" signal is applied to the $P_i$ input of the access control circuit $5_a$. Since the resolver flip-flop 24 (FIG. 2) in the circuit $5_a$ was assumed to be set, the Q output of the flip-flop is equal to "1." Referring to the truth table of FIG. 3 it can be seen that the $P_o$ output of the circuit $5_a$ remains equal to "1." It should also be noted, however, that under these conditions the signal appearing at the D input of the resolver flip-flop 24 (FIG. 2) in the access control circuit $5_a$ (FIG. 1) is equal to "O." As a result, at the next occurrence of a strobe pulse applied to the C input (FIG. 2) of the flip-flop 24, the flip-flop 24 will change state. As mentioned above, the occurrence of this strobe pulse is controlled by the control circuit 2 (FIG. 1).

At a time following the initiation of the current associative search operation when the propagation of signals along the aforementioned propagation bus should be complete and the signals should have settled to the states described above, the control circuit 2 (FIG. 1) produces the aforementioned strobe pulse. The particular structure of the control circuit 2 is not part of the invention nor is an understanding of the detailed structure of the control circuit 2 necessary for an understanding of the invention. One skilled in the art will recognize that any one of a number of pulse generators known in the prior art would suffice as the strobe pulse generator 30 and access pulse generator 31. As indicated above, it is only important that the strobe pulse generator 30 in the control circuit 2 generate the strobe pulse after at least a specified interval following the initiation of the search operation and that, as indicated below, the strobe pulse be followed by an access pulse from the access pulse generator 31.

Following the generation of the strobe pulse by the control circuit 2, the pulse is conducted over the control signal bus 18 to each of the access control circuits and is therein applied to the C inputs of the respective resolver flip-flops 24 (FIG. 2). Under the conditions described above, the resolver flip-flop 24 (FIG. 2) in the access control circuit $5_c$ (FIG. 1) changes from the reset to the set state indicating that the location $L_{N-2}$ has been selected for accessing. Substantially simultaneously, the flip-flop 24 (FIG. 2) in the access control circuit $5_a$ (FIG. 1) changes from the set to the reset state. Since the signal at the Q output of the flip-flop 24 (FIG. 2) in the access control circuit $5_c$ (FIG. 1) is, as a result, equal to "1," the occurrence of a subsequent access pulse from the control circuit 2 will fully enable the AND gate 23 (FIG. 2) to produce a "1" signal at the W output of the access control circuit $5_c$ (FIG. 1). That signal will enable the accessing of the location $L_{N-2}$.

It will be recalled that it was assumed above that both locations $L_{N-2}$ and $L_{N-1}$ contain data matching the search criterion. It is, therefore, important to note that the location $L_{N-2}$ and not the location $L_{N-1}$ was selected for accessing in the above described operation. This selection resulted from the fact that the access control circuit $5_c$, for the location $L_{N-2}$, was nearer than the access control circuit $5_d$, for the location $L_{N-1}$, on the propagation bus to the access control circuit $5_a$. It will be recalled that the access control circuit $5_a$ was the initiation point for the "1" signal on the propagation bus since its resolver flip-flop 24 (FIG. 2) was set. If, however, another associative search operation is conducted using the same search criterion, the access circuit $5_c$ is now the initiation point for the "1" signal on the propagation bus since its resolver flip-flop 24 (FIG. 2) is set. The access control circuit $5_d$, for the location $L_{N-1}$, is the access control circuit on the propagation bus nearest to the access control circuit $5_c$ for the location $L_{N-2}$. As a result, in a manner similar to that previously described, the new associative search operation results in the setting of the flip-flop 24 (FIG. 2) in the access control circuit $5_d$ (FIG. 1), the resetting of the flip-flop 24 (FIG. 2) in the access control circuit $5_c$ (FIG. 1), and the selection of the location $L_{N-1}$ for accessing. Thus, for this illustrative example, resolver 1 has selected each of the set of candidate locations, $L_{N-2}$ and $L_{N-1}$, without program controlled intervention.

In the above, applicants have presented a discussion of their invention in terms of a particular illustrative embodiment. Upon reading this application, many alternative forms of applicants' invention equally within its spirit and scope will become apparent to those skilled in the art.

We claim:

1. A resolver for use with an associative memory arrangement, said arrangement comprising a plurality of storage locations wherein each of said storage locations comprises an output line and each storage location generates match signals on its output line when the data stored in the respective location match a search criterion, comprising:

a plurality of access control circuits connected in a reentrant series by a unidirectional, signal propagation bus;

each of said access control circuits being individually connected to the output line of a corresponding one of said storage locations;

each of said access control circuits comprising: first logical means for generating access enable signals; storage means coupled to said first logical means for storing said access enable signals; and output logical means coupled to said storage means and responsive to stored access enable signals for generating a first signal for propagation on said propagation bus to the succeeding access control circuit in said series;

wherein said first logical means generates said access enable signals in response to the combined reception of said first signal on said propagation bus from the respective preceding access control circuit in said series and said match signals on the output line to which the respective access control circuit is connected.

2. The resolver of claim 1 wherein each access control circuit further comprises: second logical means responsive to the reception of said first signal on said propagation bus and to said match signals for generating a second signal;

wherein said output logical means is further coupled to said second logical means and is responsive to said second signal for generating said second signal for propagation on said propagation bus to the respective succeeding access control circuit as long as said storage means does not store said access enable signals.

3. A resolver for use with an associative memory arrangement, said arrangement comprising a plurality of ordered storage locations each of which generates association signals respectively indicating whether the respective location contains data matching any selected associative search criterion, comprising:

storage means for storing signals identifying a selected storage location;

selection means coupled to said storage means and to said storage locations and responsive to signals stored in said storage means and to said association signals for selecting a storage location for accessing;

wherein the storage location selected by said selection means is the next storage location succeeding said storage location identified by said signals stored in said storage means, which selected location stores data matching the selected associative search criterion; and means for replacing said signals stored in said storage means with signals identifying said storage location selected for accessing.

4. A resolver for use with an associative memory system, said system comprising a plurality of ordered storage locations each of which generates match signals indicating whether its respective contents match any selected search criterion, comprising:

a plurality of control means, each of said control means comprising an output terminal and each of said control means being individually connected to one of said storage locations for individually generating access control signals at its respective output terminal;

each control means connected to a storage location comprising: a flip-flop; first logical means coupled to the output terminal of the control means connected to the immediately preceding storage location and responsive to said match signals for the storage location to which the respective control means is connected for determining the state of said flip-flop; and second logical means coupled to said flip-flop for generating said access control signals.

5. The arrangement of claim 4 wherein each control means further comprises third logical means coupled to said flip-flop for controlling the accessing of the storage location to which the respective control means is connected.

6. An arrangement for use with a plurality of ordered storage locations, each of which generates association signals indicating whether the data stored in the respective storage location match any selected search criterion, said arrangement comprising a plurality of control means, each individually coupled to a corresponding storage location, each control means comprising:

an input terminal;

an output terminal;

a flip-flop;

first logical means coupled to said input terminal and responsive to control signals appearing at said input terminal for controlling the state of said flip-flop;

second logical means coupled to said flip-flop for generating control signals at said output terminal;

wherein said second logical means is further coupled to said input terminal and is responsive to control signals appearing at said input terminal and to the association signals generated by the storage location to which the respective control means is coupled; and means for propagating said control signals generated at said output terminal to the input terminal of the control means associated with the next storage location.

7. The control means of claim 6 wherein said first logical means for controlling the state of said flip-flop is further responsive to said association signals.

8. The control means of claim 7 further comprising third logical means coupled to said flip-flop for controlling the accessing of the storage location to which the respective control means is connected.

9. A resolver for an associative memory arrangement including a plurality of ordered associative storage locations, each such storage location comprising an output terminal for signals indicating whether there is an associative match for the respective storage location with respect to any selected associative search criterion, comprising:

means for generating timing signals at a selected interval following the initiation of an associative search operation;

a plurality of control means individually coupled to corresponding ones of said storage locations, each comprising: a memory means; a first input terminal; a second input terminal coupled to the output terminal of the corresponding storage location; a third input terminal connected to said means for generating timing signals; and an output terminal;

wherein the first input terminal of each control means is connected to the output terminal of another control means;

each control means further comprising first logical means responsive to signals appearing at said first, second, and third input terminals to determine the contents of the respective memory means;

each control means further comprising second logical means responsive to signals appearing at said first and second input terminals and coupled to the respective memory means to generate control signals at said output terminal of said control means.

10. A resolver for an associative memory arrangement, said arrangement comprising a plurality of storage locations each of which generates at an output terminal thereof association signals indicating whether the contents of the respective location match any selected associative search criterion, said resolver comprising a plurality of access control circuits individually coupled to corresponding ones of said storage locations and a timing means for generating first timing signals at a selected interval following the initiation of an associative search operation, each access control circuit comprising:

an output terminal;

a first input terminal;

a second input terminal coupled to the output terminal of the respective corresponding storage location;

first logical means for logically combining signals appearing at a first input terminal of said access control circuit with the association signals appearing at said second input terminal of said access control circuit to produce first control signals;

second logical means for logically combining said signals appearing at said first input terminal of said access control circuit with said association signals appearing at said second input terminal of said access control circuit to produce second control signals;

a flip-flop coupled to said second logical means and to said timing means for storing said second control signals;

third logical means for logically combining said first and third control signals for generating access propagation signals at said output terminal; and means for coupling said output terminal to the first input terminal of another access control circuit.

11. The resolver of claim 10 wherein said timing means generates second timing signals following said first timing signals and each access control circuit further comprises fourth logical means for logically combining said third control signals and said second timing signals to produce access control signals for controlling accessing of the corresponding storage locations.

12. A resolver comprising a plurality of access control circuits, each comprising:

a first AND gate comprising an output terminal;

a second AND gate comprising an output terminal;

a flip-flop comprising: an output terminal; and an input terminal connected to said output terminal of said first AND gate; and an OR gate comprising: an input terminal connected to said output terminal of said flip-flop; and another input terminal connected to said output terminal of said second AND gate.

13. The resolver of claim 12 wherein each access control circuit further comprises an inverter comprising an output terminal connected to a first input terminal of said second AND gate.

14. The resolver of claim 13 wherein each access control circuit further comprises a third AND gate comprising an input terminal connected to said output terminal of said flip-flop.

15. The resolver of claim 14 wherein in each access control circuit an input terminal of said first AND gate is connected to a second input terminal of said second AND gate.

16. The resolver of claim 15 wherein in each access control circuit said input terminal of said inverter is connected to a second input terminal of said first AND gate.

* * * * *